(12) United States Patent
Buchner et al.

(10) Patent No.: US 6,624,841 B1
(45) Date of Patent: Sep. 23, 2003

(54) VIDEOCONFERENCE SYSTEM

(75) Inventors: Georges Buchner, Paris (FR); Yannick Mahieux, Tonquedec (FR); Christian Wipliez, Lannion (FR); Jean-Pascal Jullien, Paris (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/402,022

(22) PCT Filed: Mar. 26, 1998

(86) PCT No.: PCT/FR98/00625

§ 371 (c)(1),
(2), (4) Date: Jan. 19, 2000

(87) PCT Pub. No.: WO98/44734

PCT Pub. Date: Oct. 8, 1998

(30) Foreign Application Priority Data

Mar. 27, 1997 (FR) .............................................. 97 03785

(51) Int. Cl.[7] .................................................. H04N 7/14
(52) U.S. Cl. ................. 348/14.1; 348/14.12; 348/14.01
(58) Field of Search .......................... 348/14.01–14.04, 348/14.07–14.09, 14.1, 14.11–14.15, 461–464; 370/260, 395.01, 396; 379/202; 381/92, 300, 310, 2.17

(56) References Cited

U.S. PATENT DOCUMENTS

| | | | | |
|---|---|---|---|---|
| 4,805,205 A | * | 2/1989 | Faye ........................ | 348/14.08 |
| 5,206,721 A | | 4/1993 | Ashida et al. ................ | 358/85 |
| 5,280,540 A | * | 1/1994 | Addeo et al. ............... | 348/14.1 |
| 5,335,011 A | * | 8/1994 | Addeo et al. ............... | 348/14.1 |
| 5,533,021 A | * | 7/1996 | Branstad et al. ............ | 348/464 |
| 5,548,346 A | * | 8/1996 | Mimura et al. ............. | 348/14.1 |
| 5,638,114 A | * | 6/1997 | Hatanaka et al. ........... | 348/14.01 |
| 5,793,415 A | * | 8/1998 | Gregory et al. ............. | 348/14.1 |
| 5,818,616 A | * | 10/1998 | Kawai ...................... | 348/14.08 |

FOREIGN PATENT DOCUMENTS

| | | | | |
|---|---|---|---|---|
| EP | 0 765 084 | | 3/1997 | |
| GB | 1438293 A | * | 6/1976 | ............ H04N/7/08 |
| WO | 94/16517 | | 7/1994 | |

OTHER PUBLICATIONS

Patent Abstracts of Japan, vol. 095, No. 008, Sep. 1995 & JP 07 135646.
Ichinoise et al., Visual Telephone, NTT Review, vol. 5, No. 2, Mar. 1993.

* cited by examiner

*Primary Examiner*—George Eng
(74) *Attorney, Agent, or Firm*—Patterson, Theuente, Skaar & Christensen, L.L.C.

(57) ABSTRACT

A video-conferencing system between participants located at distant sites, each site featuring a viewing screen. The viewing screen is a large screen of the projection, overhead projection, or direct projection type which has one or more viewing systems forming an image wall to simultaneously view all the distant participants within a space reproduced on the image wall formed by the screen. The system includes devices for each site that spatially distribute the sound to match the sound generated by each distant participant and the image of the participant projected on the screen at the site considered.

14 Claims, 8 Drawing Sheets

VIDEOCONFERENCE SYSTEM

BACKGROUND OF THE INVENTION

The present invention relates to a videoconferencing or teleconferencing system between participants located at remote and generally distant sites.

It applies to multpoint systems, i.e. to systems designed to produce an audiovisual link between participants at several sites. It also relates to point-to-point systems, i.e. systems that connect only two sites via an audiovisual link. It also applies to visiophones connected via a conference gateway.

The equipment of a videoconferencing system for a given site is located in a facility referred to hereafter as room or studio. In most cases, the participants are seated around a conference table facing a viewing screen.

Today, commercially available videoconferencing services and systems propose multipoint links of limited audiovisual quality due either to the quality channel banks (sound and image retrieval) or, intrinsically, to the fact that there is no bitrate because of a limit to the passband on the particular network used.

Indeed, the conferencing systems are connected to digital networks, mainly on the ISDN network, according to several configurations whether in point-to-point mode or in multipoint mode.

Consequently, the bitrate offered for such a service on the NUMERIS network varies between 128 kbit/s for a bottom-of-the-range conferencing service to 384 kbit/s for a top-of-the-range conferencing service.

The terminals used by and large comply with ITU standards such as all H320 standards.

In certain systems, only one distant room may be seen at a time. This inconveniences users who are unable to see everyone at the same time. A manual or automatic switching selects the room which is projected on the screen. In general, this room transmits the strongest audio signal (voice switching). This is so with conferencing gateways which switch the image according to voice detection, i.e. in the room with the most active sound.

Other systems compliant with ITU criteria such as standards H320 or H323 or other standards use a central unit to receive images from all Multi Conferences Units (MCU), as laid down in standards H231 and H243. This unit retrieves images by sharing the passband for transmission to a MCU as many times as the number of images transmitted.

This is achieved by encryption which substantially compresses the online bitrate at a compression factor of between 40 and 50. This results in definition loss equivalent to about three quarters of the image transmitted by each room (multipoint up to 5 rooms).

The digital compression of the image may be of the type H 320 with encryption H 261, or of the type H 323 with encryption H 263, of the moving type JPEG (ISO standard), of the type MPEG1 or, finally, of the type MPEG2.

In any one of the above profiles, the image sent may be in the form of a computer file.

In all cases, the images received are impaired and in no way reproduce the effect of multiconferencing.

DESCRIPTION OF THE RELATED ART

For further information, refer to the closest state-of-the-art technology as described in document D1 WO 94 16517.

For audio transmission, encryption systems are used or else a bitrate compression of the type G722 or G711 which does not respect the original quality of the voice signal, whether in terms of the bandwidth or in terms of the quality of the encryption itself.

OBJECTS AND SUMMARY OF THE INVENTION

The videoconferencing system according to the present invention aims to offer videoconferencing between remote sites with a maximum number of participants by exceeding the limits of today's commercially available systems. It provides a view of participants at distant sites on screens (at a scale close to 1), in which textures and patterns of behaviour are clearly perceived and in which visual and sound images match thanks to the spatially distributed sound of distant participants dependent upon the imaging conditions.

The proposed system continuously shows the participants at distant sites, even in a multipoint configuration. Moreover, the system minimises eye contact defects by using n video cameras close to the images to be filmed (for example, housed in screen windows), as illustrated subsequently. It also enables high-fidelity sound reproduction.

More specifically, the present invention proposes a videoconferencing system according to claim 1.

The image of the distant participants is at a scale close to 1 on the studio's screen; this scale depends on the distance between the screen and the table at which the participants are seated. For example, this results in a screen with standard dimensions of approximately 5×2 m to view 4 remote rooms with about 4 people in each room.

The videoconferencing system comprises one or more cameras (CA1), (CA2) and sound recording systems (microphones or acoustical antennas). The sound recording data is matched with one or the other of the cameras depending on whether the video signals transmitted originate from camera (CA1) or camera (CA2).

More specifically, this matching provides a "subjective overlay", the sound source being close to (along the axis of) the associated image.

According to another feature of the invention, the sound recording and retrieval equipment comprises:

a signal capturing and digitisation unit, a signal retrieval and analog digital conversion unit;

n microphones distributed in front of the participants at the said site;

p loudspeakers distributed along the length of the screen, where P is proportional to the size of the screen;

matching units between one or more microphones, the signal issued from the said microphone(s) and loudspeaker(s) of the remote sites intended to retrieve the said signals network adaptation devices featuring bitrate reduction;

echo control devices.

The sound is spatially distributed so as to match the sound and visual images. This layout not only strongly enhances the effect of teleconferencing but also enables several conversations to be conducted in parallel between the two remote rooms; monitoring of conversations is simplified by the system's ability to focus on the person one wants to listen to, just as in a normal meeting.

The devices that establish correspondence between the microphone, the signal originating from the said microphone and the loudspeakers of the remote sites intended to retrieve the said signal operate by programming the desired configuration. Such programming may involve memorising one or more pre-determined configuration(s).

According to another feature, the image recorders comprise q cameras for each site, this number preferably exceeding or being equal to 2. The cameras are positioned in front of the participants of the said site so as to be laid out in distinct areas revealing the various remote participants on the screen or near these areas. In practice, the cameras may be laid out below, on top of or around the screen.

Each room may therefore comprise several cameras which film the participants at different angles. The images which are transmitted to a site are those recorded by the camera located near the image projected for this site. This makes it possible to reduce the eye contact effect, to differentiate viewpoints and reconstitute the location of each participant according to his/her position at the site and within the overall configuration.

In a point-to-point configuration where several images are juxtaposed across the width of the screen, each image provides a partial view of the facility. This makes it easier to know who is watching whom on the screen and therefore to follow the dynamics of the meeting.

In practice, the cameras are positioned under (or below) the images projected on the screen 10.

For a configuration with two concatenated images (one beside the other), the cameras are realigned and are located at a distance from the screen centre corresponding to about one third of the width of the image, i.e. one sixth of the total width of the screen. Such realignment minimises the problem of overlapping at the edges of the two images filmed by the two cameras.

The sites are linked together via a high bitrate network in a point-to-point or multipoint configuration, or via a central MCU unit (videoconferencing gateway).

BRIEF DESCRIPTION OF THE PREFERRED EMBODIMENTS

Other features and advantages of the invention will emerge on reading the description herein which is given as a non-exhaustive illustration and with regard to the drawings in which.

Figure 1:
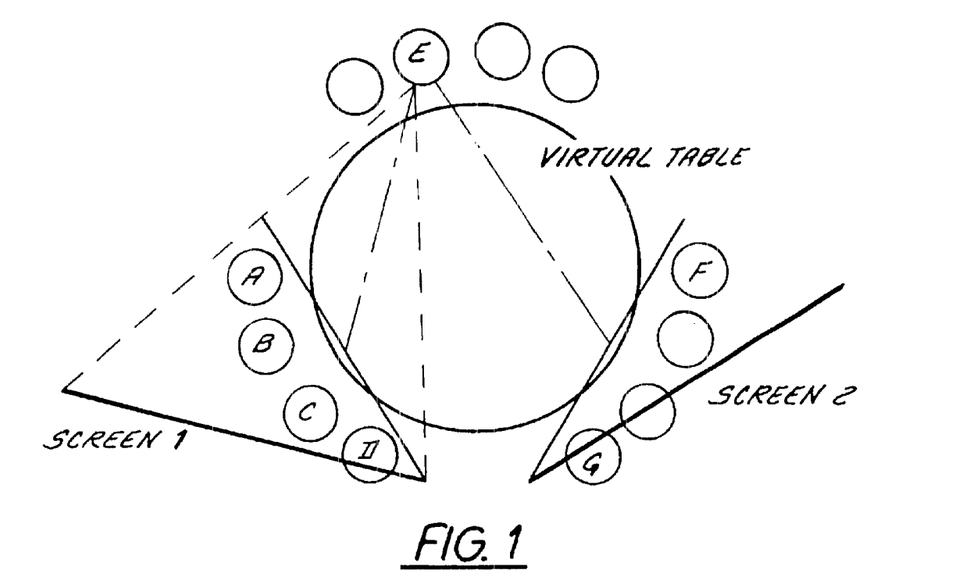
FIGS. 1 and 2 illustrate schematically the teleconferencing problem that the invention solves.

In order to describe an approach to the teleconferencing effect, FIG. 1 illustrates a view of a meeting similar to one in real-life.

Let us assume 12 people seated around a circular virtual table. One participant can see another 4 adjacent people of the group through a window and by developing the surface it may be assumed that the participant can see these 4 people on a flat or almost planer screen. He will therefore see the other 8 people in groups of 4 in 2 different studios on 2 screens practically in a planar configuration. As a general rule, the virtual table is not circular but is positioned longitudinally with the groups of participants seated on either side. Consequently, person E will see A to his/her left and F to his/her right with continuous adjacency between all the individuals present.

Figure 2:
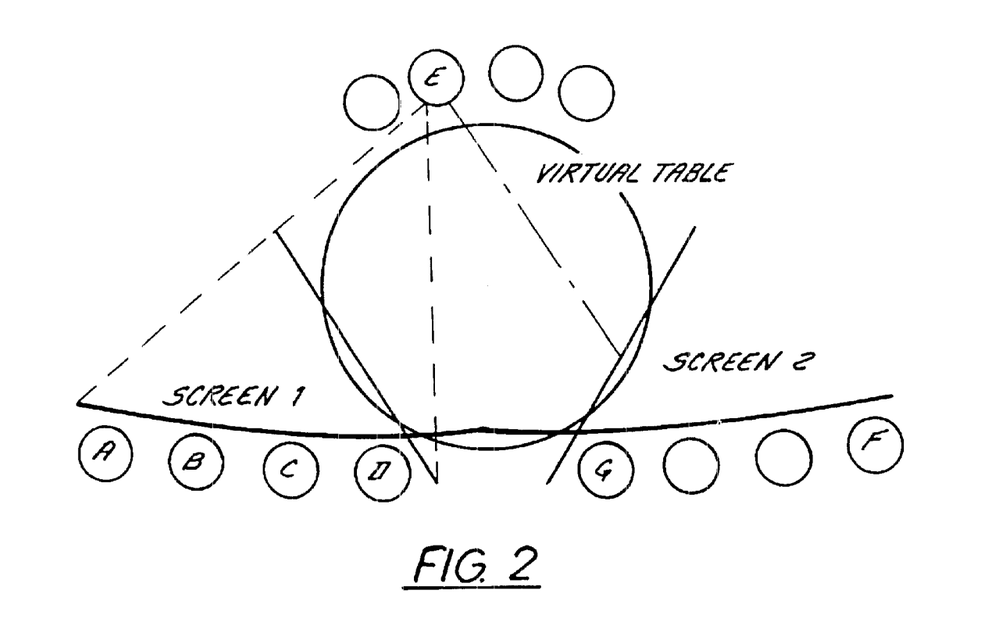

FIG. 2 illustrates the screen(s) which is(are) slightly curved to reproduce an immersion configuration.

This environment makes it possible, inter alia, to reproduce glances exchanged between participants by approximating eye play between participants turning and observing one another. For example, A may observe E and any other person will see A looking at F with a subjective approximation of viewing angles.

Figure 3:
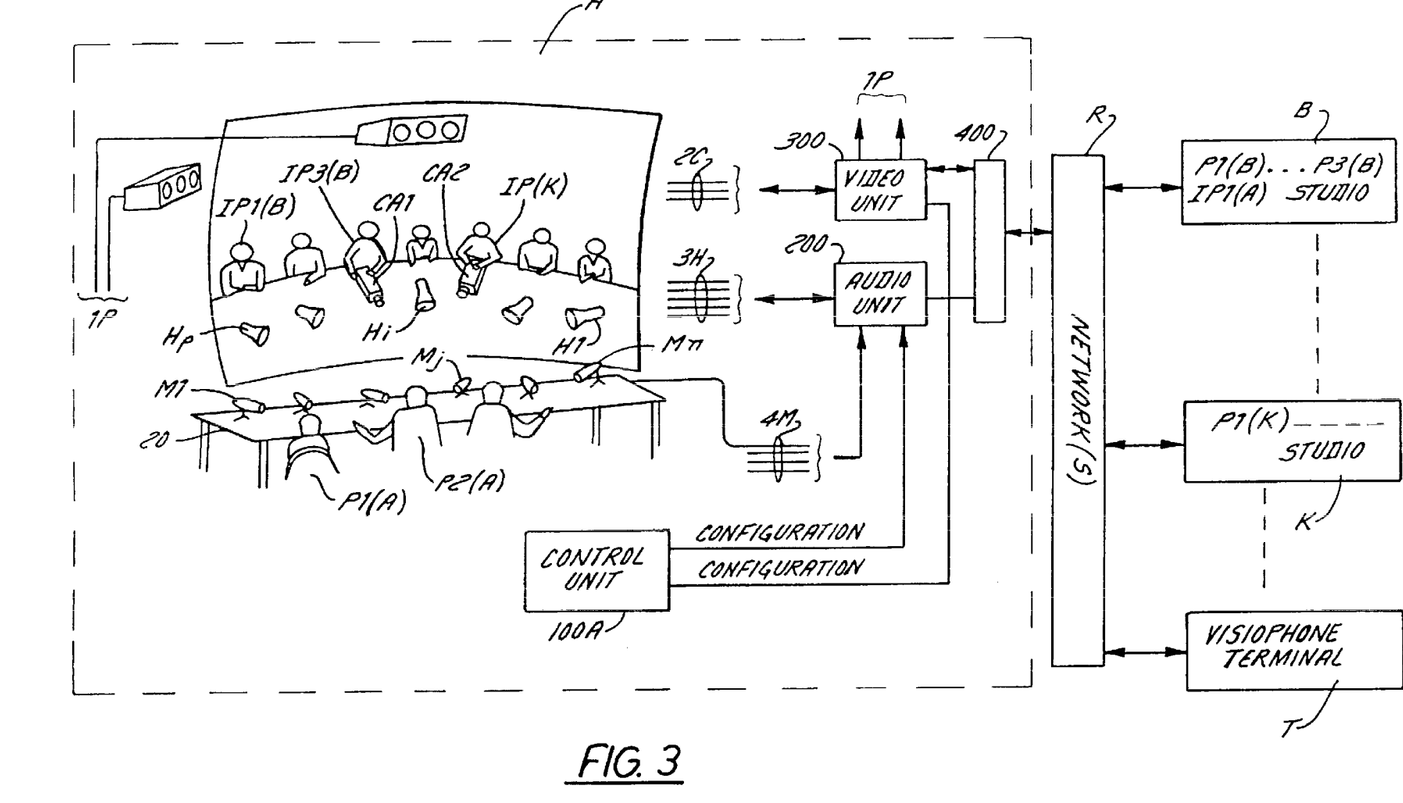
FIG. 3 illustrates the schematic diagram of the invention.

The sketch in FIG. 3 illustrates the schematic diagram of a teleconferencing system according to the invention.

Of course, other options are possible as to the position of the participants (seated or standing, around a table or not), the position of the camera(s) and position of the loudspeakers in so far as such positions make it possible to obtain a sound/space distribution and an image wall simulating the total immersion of all the participants.

Site A is connected to other sites B . . . K via a high bitrate network. The different connection options for these sites will be detailed subsequently in FIGS. 10 to 13. For example, the ISDN (integration services digital network) may be used by grouping several S0 access points. It is also possible to use information highways, the Internet or HDSL access devices. Such networks are not incompatible with analog sound signals with a passband exceeding 7 kHz provided that use is made of bitrate compression systems which retain the original quality. This provides high sound quality equivalent to that provided by a digital compact disc (CD).

The transmission network used by an asynchronous transfer mode network (ATM) or another high bitrate network of the digital or analog type. All the images can be transmitted to different sites at high throughputs without the need to increase the compression factor during encryption.

For example, the encrypted images are transmitted between 384 kbit/s on the Numeris network and 2 Mbit/s depending on the type of network used.

The videoconference is controlled or remotely controlled by units 100A, 100K which converse via the network(s) R to comply with the established correspondence between the participants, the sound image and the visual image. In other words, the control units transmit either a description of the configuration with the signals transmitted if the configuration has not already been predefined, or a description of the configuration mode chosen from several configurations already defined for all the sites. They are able to manage all the studio equipment according to the desired configuration. Among the possible conferencing configurations, a point to point link or multipoint links between 3, 4 , 5 or more sites are possible options.

In practice, the configuration involves describing the link between a participant of a site P1 (A) , the sound recording system(s) M1 (microphones or acoustical antennae) which pick up the participant's conversation, the camera which films him/her CA1 so that the image IP1(A) on the site B matches the loudspeaker(s) H1 which reproduces the sound delivered by the microphone(s) M1.

For this purpose, a site A comprises n microphones, p loudspeakers and q cameras. For a given site, the number of loudspeakers is proportional to the size of the screen (either along the width or along the surface of this screen).

For participants seated around a table, the large screen 10 is laid out in front of the conference table of a given site and the screen images (of each site) are projected on this screen so that the remote participants are on the same level as the participants of the site, thereby creating a virtual table.

When the participant P1(A) is addressing participant PI(B), the images of the camera CA1 of site A are beamed to the other sites B to K. Moreover, the images of camera CA1 of site B are transmitted to the sites A, C to K. If no participant speaks at the other sites, the camera filming at these sites is indifferent although the images of all participants are transmitted nonetheless.

The camera images are controlled by control units 100A–100K present on the sites or remote-controlled from a monitoring site.

The servo control between the sound recording made and the camera which must record the images is ensured via a control programme known to those skilled in the art. This program is implemented by units 100A to 100K to obtain images giving the impression, once projected on the screens, that the persons concerned are really looking at one another.

In practice, this effect can be produced by using only two cameras.

The images transmitted by the network are received at each site and processed by the video units 300 in order to be projected in a juxtaposed and/or overlaid way on the screen. However, all the images received are projected on screen 10 at each site, the said screen forming an image wall.

In the particular case of a point to point system, the images projected on each screen correspond to a single room. This configuration makes it possible to enhance the quality of the image. For this purpose, it is proposed to transmit both images, each one obtained by a camera. Each camera records partial images of the facility. In practice, a camera films half the scene while the other camera films the other half.

The juxtaposition of images is controlled by processing units 100A and 100B which control the video processing units to project on the screen a single image based on signals sent by the two cameras. The image concatenation is an intrinsically traditional type of image processing.

Figure 4:
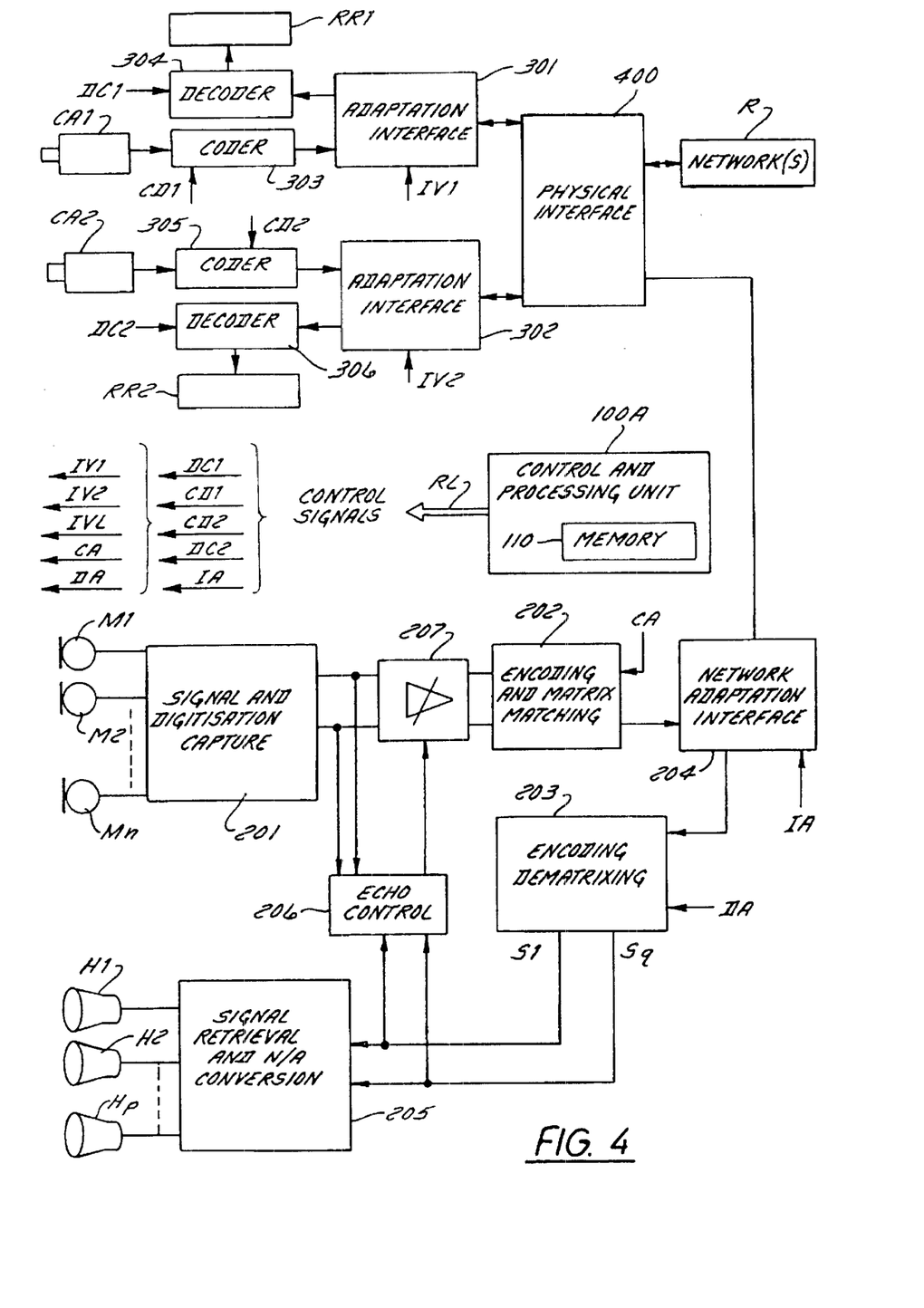
FIG. 4 illustrates the diagram of the embodiment of the equipment in a studio, FIG. 5 corresponds to the diagram of a particular embodiment in the case of a conferencing link between 3 studios, FIG. 6 corresponds to the diagram of a particular embodiment in the case of a link between 2 studios.

FIG. 4 illustrates more fully the processing and control units that are part of the system. Again, this is another example in which there are two cameras per studio.

For the video part:

The first camera CA1 is connected to a video encoder 303 and a video decoding unit 304 is connected to an initial projector PR1. The decoding unit comprises one or more decoders so that each decoder decodes the video signals originating from the site. In the subsequent description, mention will be made of the decoder 304 since a set of decoders may apply.

The encoder and decoder are connected to a video signal adaptation and transmission interface 301 on the network R. For example, the said interface will be an interface AAL1 (Adaptation Layer) for transmission on the ATM network.

This aforesaid interface is connected to a physical support interface 400.

For example, the control unit 100A sends, via a local network RL, the control signals CD1, DC1, IV1 respectively for the encoder, decoder and adaptation interface 301 according to the videoconferencing configuration.

Similarly, the second camera CA2 is connected to an encoder 305 which is itself connected to an transmission adaptation interface 302 on the network. A decoder 306 is coupled to the second projector PR2 and to the interface 302. The interface 302 is connected to the physical support interface 400.

The control unit sends the control signals CD2, DC2 and IV2 respectively to the encoder, decoder and adaptation interface depending on the configuration.

A video encoder may be functionally connected to several decoders in accordance with techniques that fall outside the scope of the present invention.

A third camera at one site might then be coupled to one of the encoders 303 or 305 and transmit images of a particular person to be prioritised. The images of this camera would be encrypted by the encoder to which it is connected and transmitted to all the other sites. All the other sites would then have to be equipped with an additional decoder in the decoder unit 303 or 306 of such sites to process the video signal delivered by this camera and to project on the screen 10 of the sites the shots related to such images.

The projectors are either video projectors or liquid crystal overhead projectors. Projection may be direct provided that a plasma screen is used.

For the audio part:

The n microphones are connected to a signal capturing unit 201 that digitises the signals. The outputs of this unit 201 are applied at the inputs of an attenuation unit 207 in order to control the echo. The outputs of the attenuation unit are applied at the inputs of a bitrate reducer encoder for the audio signal 202 controlled by the unit 100A. The encoder 202 also performs matrixing of the microphone signals to match the number of channels available on the network for audio transmission. For this purpose, the encoder receives the configuration control signal CA. The audio adaptation encoder 202 is connected to a transmission adaptation interface 204 on the network R, which will be an interface AAL5 for the ATM network. This interface is connected to the physical support interface 400.

The interface 204 is able to issue encrypted audio signals on the network and to receive encrypted audio signals issued by the other sites. The signals received are processed by the interface 204 and applied to a decoding unit and audio signal dematrixing unit 203.

The signals delivered by the decoding and matrixing unit 203 are applied to the desired loudspeaker(s) via an audio signal retrieval and analog digital conversion unit 205. This unit 205 is designed to send to the appropriate loudspeakers the required signals received.

Where the configuration is programmed and memorised in a memory 110 of the control unit, the unit 100A will contain in the memory table information indicating that the output S1 of the decoder is delivering the signal which has been picked up by the microphone M1 or by a series of microphones which includes M1 of a site B and that this output must therefore be routed to the loudspeaker Hn or to a series of loudspeakers which includes H1 to produce a close-up view of the participant who has spoken.

The capturing systems (microphone and unit 205) are chosen to respect the voice signal passband and operate in frequency bands at 7 kHz (the lower limit of the system in terms of quality). The encryption system is also chosen to respect this original quality while bitrate reduction algorithms will be selected, as described by standards MPEG1 or MPEG2. The capturing systems are also chosen to provide a good signal/noise ratio.

In the case of two rooms in a point to point configuration, a possible configuration would comprise 6 sound channels, i.e. one for each microphone. In the case of 3 rooms, there will be two times 3 sound channels at each site. For site A, 3 channels will provide the audio link between A and B while the three others will provide the audio link between A and C (similarly for B and C).

Images and sound are transmitted with the lowest possible time shift (about a hundred milliseconds), which, combined with the quality and size of the video image, may allow a deaf person to read the lips of distant correspondents.

Moreover, the audio equipment comprises an echo control circuit 206 operating as a gain variator on the microphone signals via the variable attenuation unit 207 in accordance with intrinsically standard processes. The said circuit is connected to the outputs of unit 201 and to the inputs of unit 205.

Figure 5:
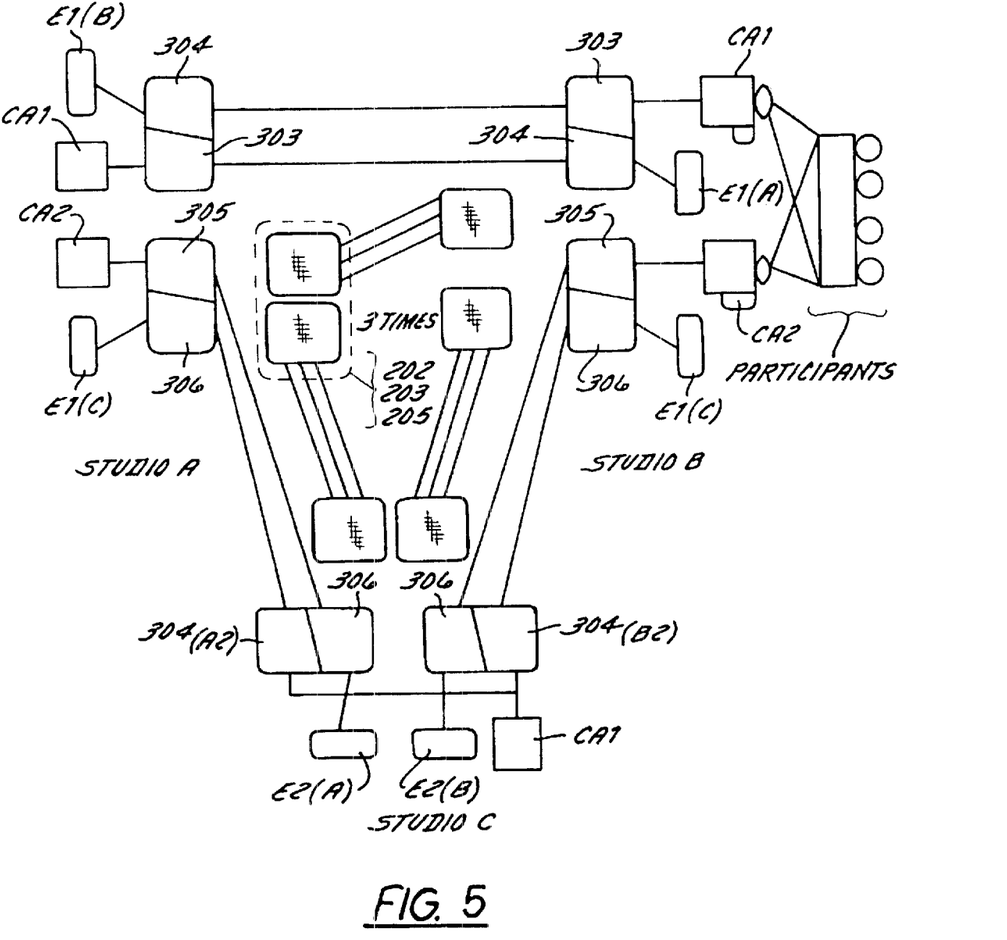

The diagram in FIG. 5 illustrates a possible configuration of the above. This is a video configuration between three sites A, B and C.

The said figure has been simplified by highlighting the direct links that such a configuration provides between the different sites by disregarding the transmission network.

This configuration is described from 3 sites: A, B and C.

Sites A and B each have two cameras CA1 and CA2 which film at different angles at the same site.

In accordance with this configuration, point-to-point links are provided for the encoders and decoders.

The camera CA1 is connected to encoder 303 of site A. This encoder is connected to the decoder 304 which is connected to the projector which provides the screen image E1(A) (image originating from camera CA1 of site A).

The encoder 303 of site B is connected to the camera CA1 of the site B. The signal supplied by the decoder is decrypted by the decoder 304 of the site A to supply the screen image E1(B) (image originating from the camera CA1 of the site B).

In the studio C, a single camera referenced CA1 has been installed. This camera is connected to the two encoders 304(A2) and 304(B2). The encoder 304(A2) is connected to the decoder 306 of the site A associated with the screen image E1(C) and the encoder 304(B2) is connected to the decoder 306 of the site B associated with the screen image EI(C).

Conversely, the decoders 306 of the site C are connected to the encoder 305 of the signal of the camera CA2 of the site A, the other to the encoder 305 of the signal of the camera CA2 of the site B to display respectively on the site C the screen images of the site A, i.e. E2(A) and of the site B, i.e. E2(B).

The audio processing units are also doubled according to this configuration so as to connect an audio unit 202, 203, 205 with each site.

Figure 6:
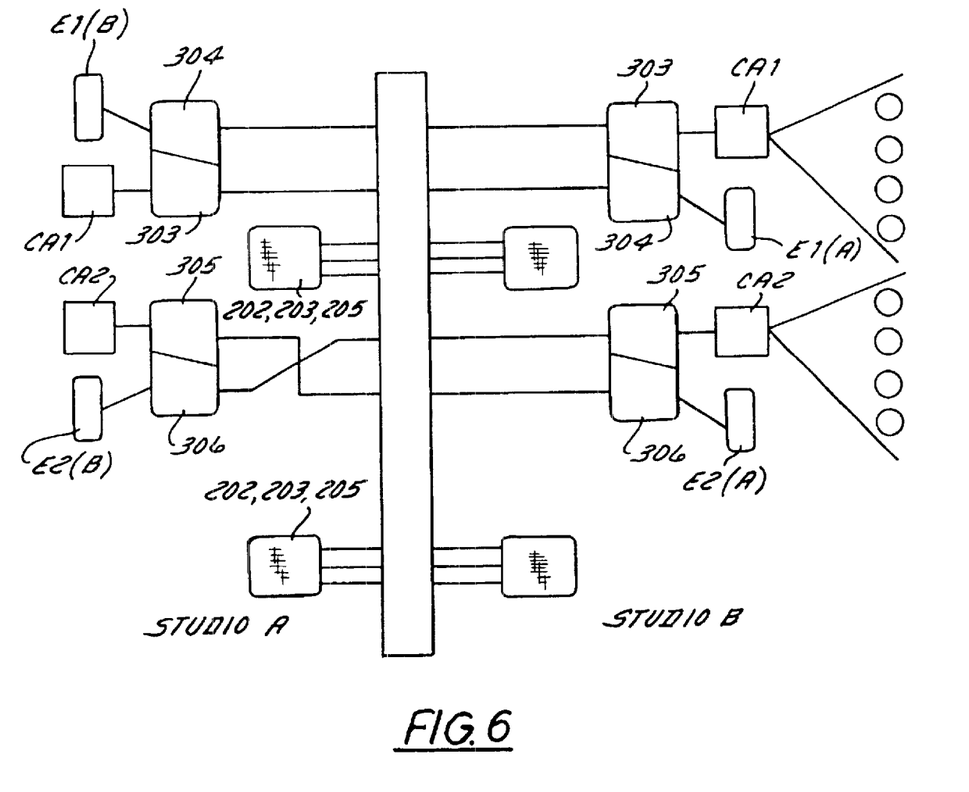

FIG. 6 illustrates a point-to-point link between a site A and a site B. In this case, each camera CA1, CA2 captures a partial view of the site.

In the event of transmission of 6 audio signals (6 microphones), two encoders-decoders will be used on three channels for each site.

Figure 7:
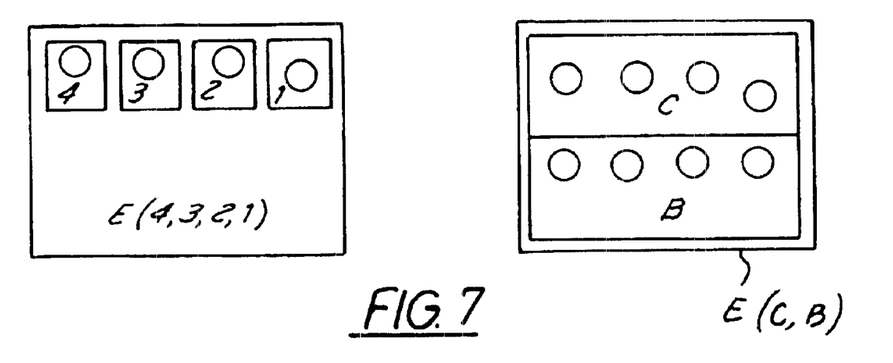
FIGS. 7 to 9 illustrate an example of different "screen images" forming the image wall on the large screen.
Figure 8:
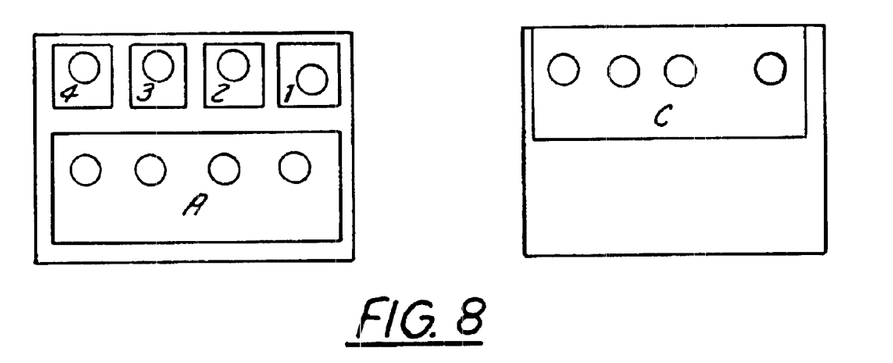
Figure 9:
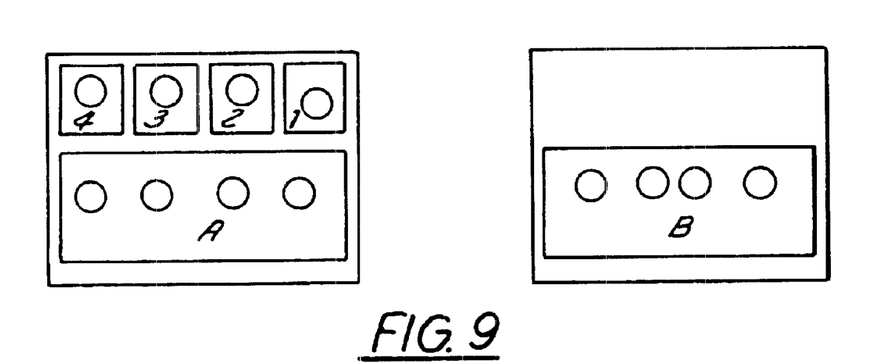

FIGS. 7 to 9 illustrate respectively the screen images projected on the site A, B and C. On the site A (FIG. 7), the screen image E (4,3,2,1) provides views produced from individual terminals while the screen image E (C,B) provides superimposed views of the sites C and B.

FIG. 8 illustrates the viewing configuration at the site B while FIG. 9 illustrates the viewing configuration at the site C.

FIGS. 10 to 13 illustrate examples of possible links between the sites.

Figure 10:
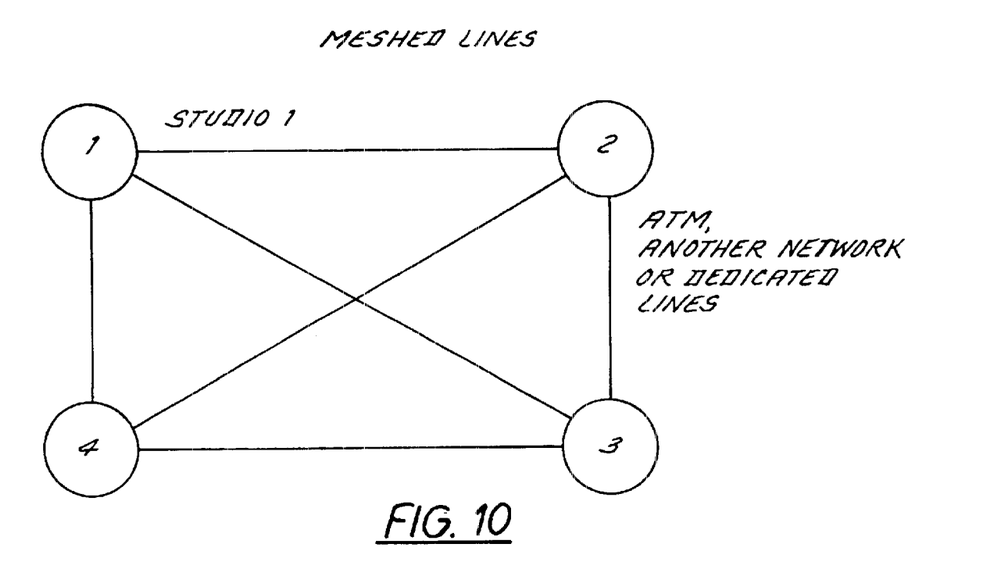
FIGS. 10 to 13 show different connection modes between studio equipment or video sound terminals according to the invention in the different network configurations.

FIG. 10 illustrates 4 studios connected via a ATM network or a dedicated line.

Figure 11:
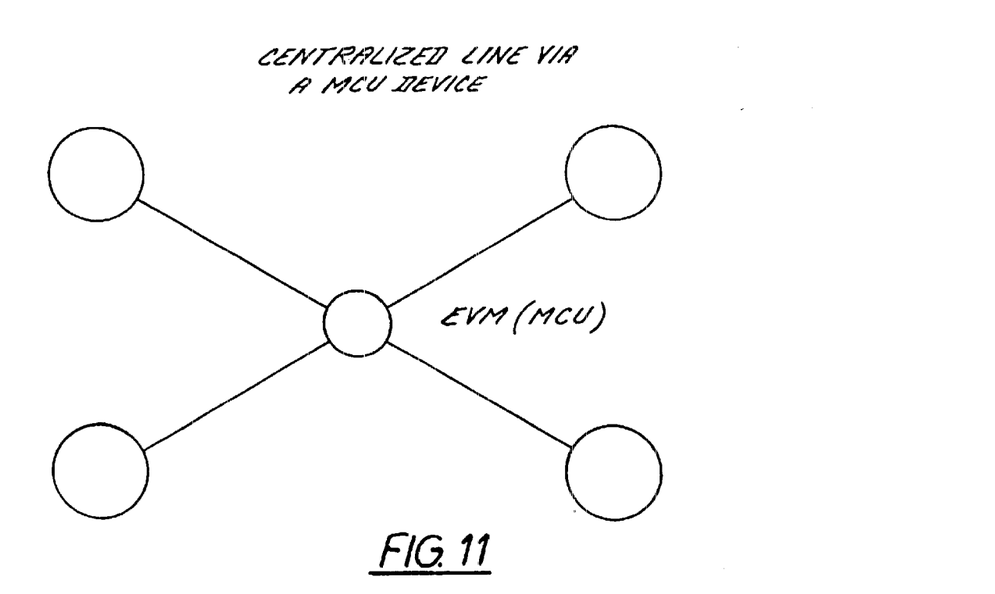

FIG. 11 illustrates connections provided via a centralised MCU unit (videoconferencing gateway).

Figure 12:
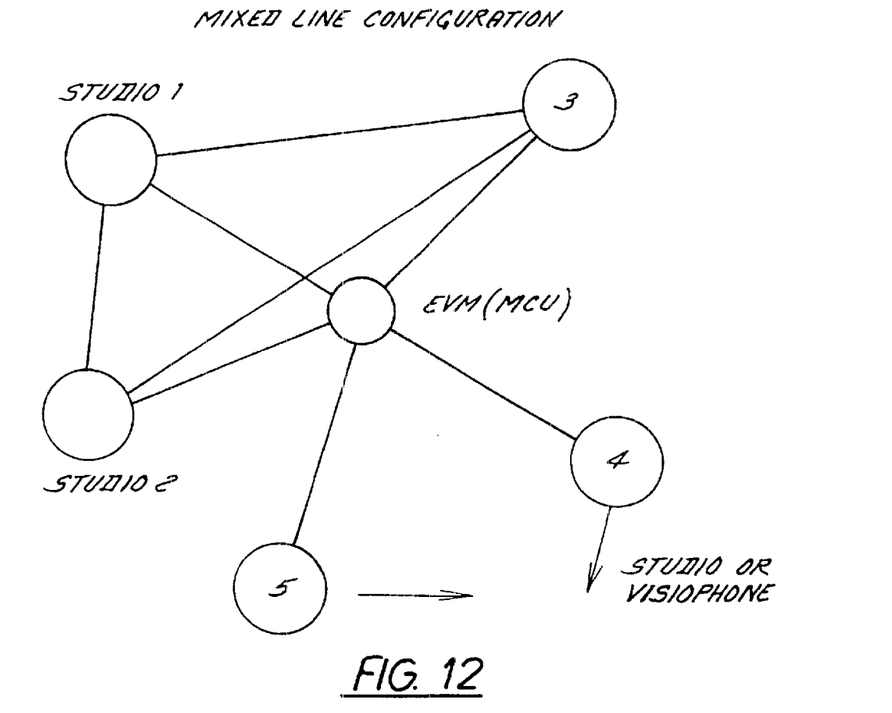

FIG. 12 illustrates mixed network lines and a MCU device, i.e. a commercially available videoconferencing gateway and including a device to suppress the audio signals of the studios 1, 2 and 3 since the sites that have direct links and a connection via such hardware would be adversely affected by the superimposition—and time shift—of signals issued from the direct network links and MCU connections.

Figure 13:
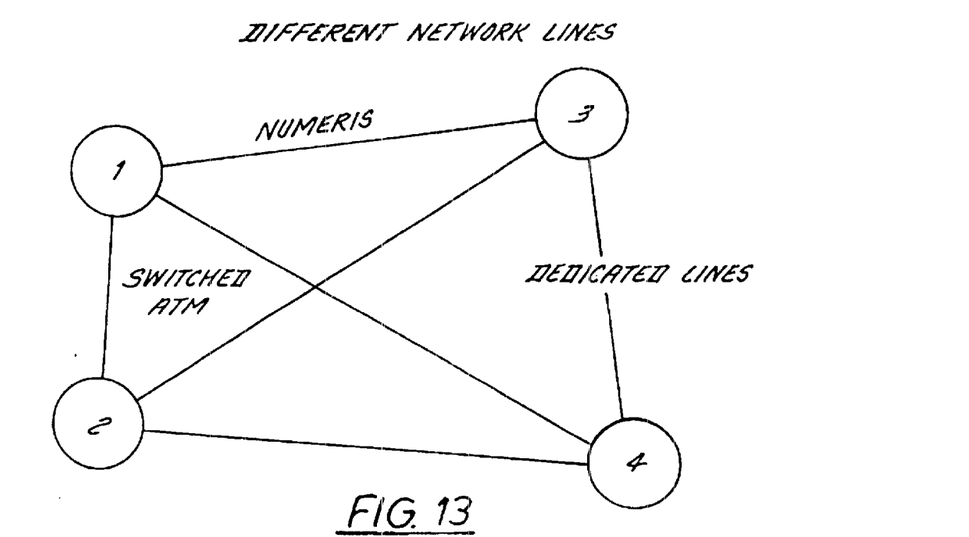

FIG. 13 illustrates a connection via different types of networks such as Numéris, ATM and dedicated lines.

What is claimed is:

1. A videoconference system between a plurality of participants located at N distinct sites connected by a network, with N>2, including at each site a viewing screen, image recording and retrieval devices as well as sound recording and retrieval devices, in which:

said distinct sites are connected together according to a correspondence established between them and described by an overall configuration;

the viewing screen in each site simultaneously displays all the other sites, and the sound recording and retrieval devices include, for each given site, devices that match the sound produced at each other site with the images displayed at said given site, wherein:

said viewing screen is a large screen of the projector type, overhead projector type, or direct projector type, comprising one or more viewing systems forming an image wall to simultaneously view images of all distant participants within a space reproduced on the image wall formed by said screen;

said given site transmits video and audio signals and receives video and audio signals transmitted by the other sites in accordance with the established correspondence, the sound reproduced at each given site being spatially distributed to match both the sound produced by each distant participant of each other site, and the participant's image projected at the given site, with simultaneous viewing of all distant participants and simultaneous listening to all distant participants achieved by audio signal exchanges between the given site and other sites, seamlessly and without disturbing the other participants, and therefore each site comprising sound recording and retrieval devices, which include:

a signal and digitization capturing unit;

a signal retrieval and analog digital conversion unit;

n microphones, each generating an audio signal, laid out in front of the participants at that site, n being an integer number greater than one, wherein said given site transmits the audio signals of each of the n microphones to each other site;

p loudspeakers laid out along the length of the screen where p is an integer number greater than one and proportional to the size of the screen;

a network adaptation device comprising a bit rate compression device;

an echo control device; and a control and processing unit comprising a memory storing at least one overall configuration describing said correspondence, said control and processing unit matching the audio signal generated by each of said microphones with at least one loudspeaker at a distant site in accordance with said correspondence.

2. The videoconferencing system according to claim 1, wherein the screen which forms the image wall has dimensions chosen to enable the display of images of all participants at a scale close to one.

3. The videoconferencing system according to claim 1, wherein said image recording devices comprise an initial camera and a second camera and wherein each audio signal is associated with one or the other of said cameras depending on whether the video signals transmitted originate from one or the other of said cameras.

4. The videoconferencing system according to claim 1, wherein the sound recording devices further comprise encryption and matrixing devices for the audio signals.

5. The videoconferencing system according to claim 1, wherein the sound retrieval devices further comprise decoding and dematrixing devices for the audio signals.

6. The videoconferencing system according to claim 1, wherein each image recording device comprises, for each site, q cameras positioned in front of the participants of said site, q being an integer number greater than one, so that each camera films different groups of participants to be displayed on distinct parts of the screen at a distant site.

7. The videoconferencing system according to claim 6, wherein videoconferencing is achieved between N sites and wherein the number q of cameras per site is greater than or equal to 2 so as to reproduce in the image the effects of perspective.

8. The videoconferencing system according to claim 1, wherein the videoconference is produced between only two distant sites, wherein at a given site, the image recording devices comprise two cameras and wherein one camera films a partial view of the given site comprising an initial group of participants, wherein the other camera films a partial view of the given site comprising a second group of participants, and wherein the two resultant images are juxtaposed at the distant site to enable a view of all the participants.

9. The videoconferencing system according to claim 1, wherein the image recording devices comprise several cameras used for filming and wherein said cameras are positioned beneath the projected images.

10. The videoconferencing system according to claim 1, wherein said system also comprises several cathode-ray or liquid crystal video or overhead projectors used to project images on a scale close to 1.

11. The videoconferencing system according to claim 1, wherein said system comprises image processing devices for each site capable of juxtaposing or superimposing the images received from the distant sites to allow all the images to be displayed on the screen.

12. The videoconferencing system according to claim 1, wherein the sites are directly connected via high bit rate transmission network lines that may be different, or indirectly via a videoconferencing gateway or via network lines and a videoconferencing gateway.

13. The videoconferencing system according to claim 1, wherein said control and processing unit is selected from the group including a PC and a workstation, and wherein each site further includes video encoders-decoders controlled by control signals from the control and processing unit, and transmission adaptation interfaces for the network.

14. The videoconferencing system according to claim 13, wherein the network is an ATM (asynchronous transfer mode) type transmission network, wherein the transmission adaption interface for the video signals are AAL1 type interfaces and wherein the transmission adaptation interface for the control signals are AAL5 type interfaces.

* * * * *